W. E. DAVEY.
PROCESS OF REINFORCING TREES.
APPLICATION FILED SEPT. 30, 1908.
957,940.
Patented May 17, 1910.
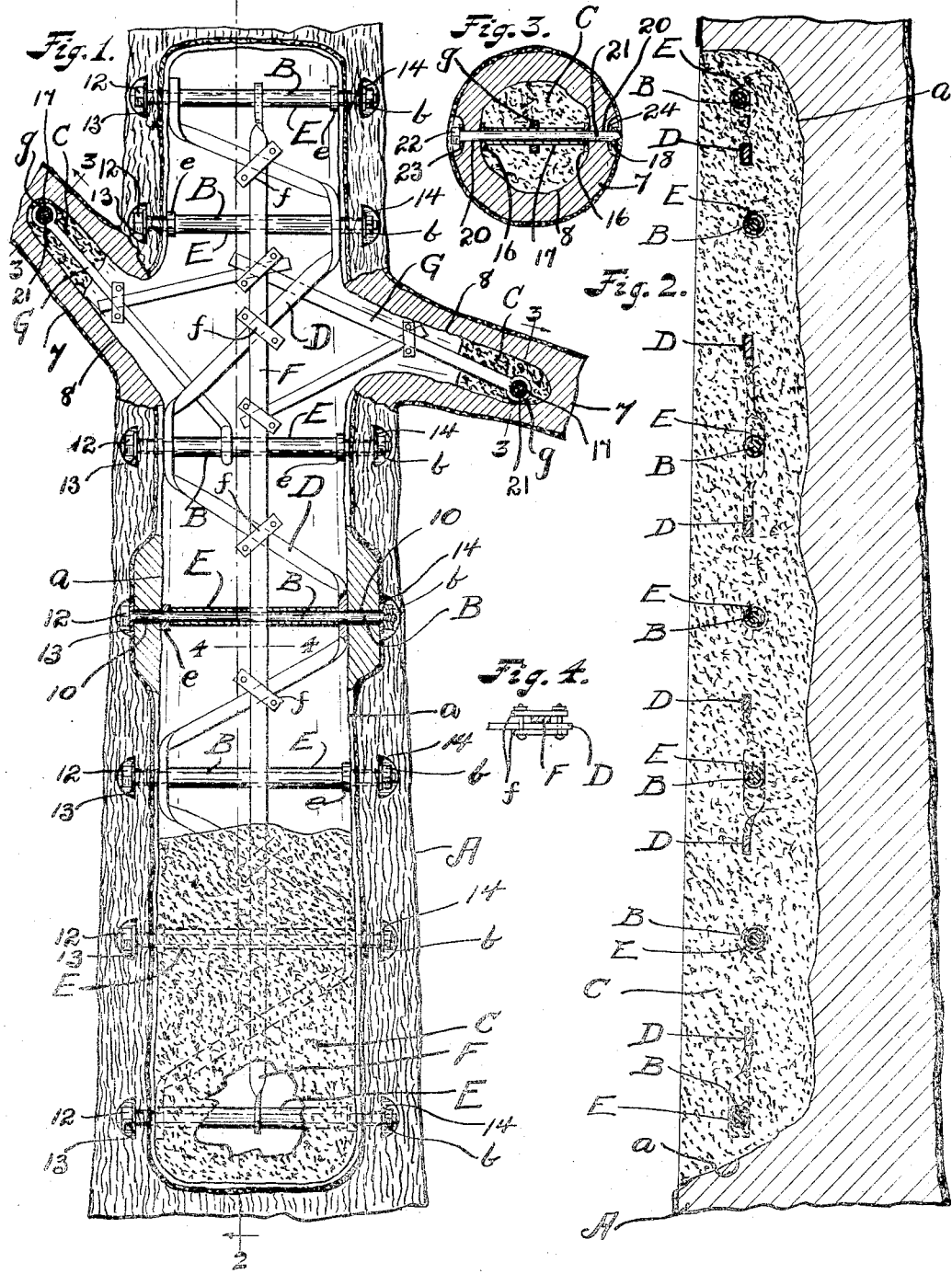
Witnesses:
H. J. Gettins
B. C. Brown
Inventor:
Wellington E. Davey
By his Attorneys

UNITED STATES PATENT OFFICE.

WELLINGTON E. DAVEY, OF KENT, OHIO.

PROCESS OF REINFORCING TREES.

957,940.      Specification of Letters Patent.      Patented May 17, 1910.

Application filed September 30, 1908. Serial No. 455,477.

*To all whom it may concern:*

Be it known that I, WELLINGTON E. DAVEY, a citizen of the United States of America, residing at Kent, in the county of Portage and State of Ohio, have invented certain new and useful Improvements in Processes of Reinforcing Trees; and I hereby declare the following to be a full, clear, and exact description of the invention, such as will enable others skilled in the art to which it pertains to make and use the same.

This invention relates to an improvement in the art of reinforcing a tree whose trunk has a hole or cavity therein extending to the exterior and longitudinally of the trunk, and pertains more especially to a process of reinforcing a tree which has the said cavity adjacent a limb of the trunk and enlarged by a cavity formed in the inner end of the said limb.

The primary object of this invention is to reinforce the hollow portions of the said trunk and connected limb and thereby render the said trunk and connected limb strong enough to withstand the elements.

Another object is to efficiently mechanically tie together opposite side walls of the cavity in the trunk so that the said walls will be retained in a fixed position relative to each other preparatory to filling any portions of the cavity, which are not occupied in thus tying the said walls together, with concrete or cementitious material and so that the said walls will not become loose relative to the cementitious filling and so that the cementitious filling is adequately reinforced.

Another object is not only to inexpensively tie together the said walls of the cavity at suitable intervals longitudinally of the trunk or branch, but to inexpensively and efficiently brace the said walls at suitable intervals longitudinally of the trunk or branch and from within the cavity preparatory to the application of the aforesaid concrete or cementitious material.

Another object is to inexpensively but efficiently mechanically support a limb of the trunk or branch from the latter where the cavity formed in the trunk or branch has been enlarged by a cavity formed in the inner end of the said limb.

With these objects in view, and to the end of realizing any other advantages hereinafter appearing, my improved process consists in the steps hereinafter described and pointed out in the claims.

The accompanying drawings illustrate the treatment of a bruise or wound in the trunk of a live tree by my improved process.

In the said drawings, Figure 1 is a side view of a portion of a trunk of a live tree and also shows the inner ends of two limbs of the said trunk, and portions are broken away and in section in this figure to more clearly show the construction. Fig. 2 is a vertical section on line 2—2, Fig. 1, looking in the direction indicated by the arrow. Fig. 3 is a transverse section on either line 3—3, Fig. 1, looking outwardly, but on a larger scale than Fig. 1. Fig. 4 is a horizontal section in detail on line 4—4, Fig. 1, looking downwardly.

Referring to the drawings, A indicates the trunk of a live tree which is to be treated by my improved process, and $a$ represents a cavity which is formed in one side of the said trunk by removing all decayed and unsound wood or foreign matter from the bruised, diseased or injured spot in the said side of the trunk. The cavity $a$ extends longitudinally of the trunk A across the inner end of two limbs 7 and 7 which were diseased or unsound interiorly and centrally at the junction of the limbs with the trunk A. Each limb 7 is therefore provided with a cavity 8 by removing all decayed or unsound wood and foreign matter from the diseased or injured spot in the respective limb centrally of the inner end of the limb,—that is, at the junction of the limb with the trunk A. The cavities 8 in the limbs 7 connect therefore with the cavity $a$ in the trunk A.

The first step of my improved process comprises the formation of the cavity $a$ large enough and removing all decayed and unsound wood and foreign matter from the diseased or unsound spot in the trunk A by the formation of the said cavity, and then, if said trunk has limbs 7 which are diseased or wounded as already indicated, to form the cavities 8 in the said limbs by removing all decayed or unsound wood and foreign matter from the diseased and unsound central portions of the inner ends of the limbs at the junction of the latter with the limb-supporting trunk and have the said cavities in the said limbs connect with the cavity $a$ in the limb-supporting trunk.

The walls of the cavities $a$ and 8 are coated with a waterproof composition or material, such, for instance, as bituminous paint, to seal the pores in the wood, and any exposed wood exteriorly of the trunk A is similarly painted or coated.

The trunk A is mechanically reinforced interiorly of the cavity $a$ by mechanically tying opposite side walls of the cavity together at suitable points longitudinally of the trunk and by bracing the said walls from within the cavity and at suitable points longitudinally of the trunk. Preferably bolts B are arranged transversely of the cavity $a$ at suitable points longitudinally of the trunk A. Each bolt B engages two holes 10 and 10 formed in opposite side walls respectively of the cavity $a$. Each bolt B bears a washer 13 which is mounted on the shank of the bolt at the outer side of one of the side walls of the cavity $a$ between the respective wall and the head 12 of the bolt, and a washer 14 is mounted on the said shank at the outer side of the other side wall of the said cavity and between the last-mentioned wall and a nut $b$ which engages the correspondingly threaded free end of the said shank. By tightening the nuts $b$ on the bolts B the side walls of the cavity $a$ are effectually tied together, and spreading apart of the said walls from any cause is positively prevented. It will be observed therefore that opposite side walls of the cavity $a$ are inexpensively and efficiently tied together at suitable points longitudinally of the trunk A. A sinuously extending metal rod or bar D is arranged within and longitudinally of the cavity $a$ and embraces adjacent bolts B at opposite side walls respectively of the said cavity and braces the said walls from within the cavity at suitable points longitudinally of the trunk A. On each bolt B is mounted a tube E which extends at one end into contiguity with the brace D at one side wall of the cavity $a$ and at its other end into contiguity with a washer $e$ which is snugly interposed between the last-mentioned end of the tube and the opposite side wall of the said cavity. It will be observed therefore that the tubes E, washers $e$ and brace D constitute means whereby opposite side walls of the cavity $a$ are braced mechanically where the said walls are mechanically tied together and from within the cavity.

The limbs 7 and 7 are arranged substantially opposite, and, as already indicated, the cavity $a$ extends above as well as below the said limbs. The brace D extends diagonally of the cavity $a$ centrally between the cavities 8 and 8 in the limbs 7 and a suitable distance above the said limbs, and the said walls of the cavity $a$ are mechanically tied together and braced above as well as below the said limbs as clearly illustrated in Fig. 1.

The brace D is preferably reinforced centrally between the side walls of the cavity $a$ by a metal bar F which is arranged longitudinally of the said cavity and suitably clamped or otherwise secured to the said brace, as at $f$. The brace D is suitably connected at its ends to the uppermost and lowermost tubes E.

When the side walls of the cavity $a$ have been tied together and braced or reinforced interiorly of the trunk A as hereinbefore described, opposite side walls of the cavity 8 in each limb 7 are mechanically tied together and braced internally of the said limb and also mechanically tied internally of the said limb to the metallic reinforcement provided for the trunk A. The means for tying opposite side walls of each cavity 8 together preferably comprises a bolt 21 which is arranged transversely of the said cavity and engages two holes 20 and 20 formed in opposite side walls respectively of the said cavity. (See Fig. 3.) The said bolt 21 bears a washer 23 which is mounted on the shank of the said bolt at the outer side of one of the side walls of the said cavity 8 between the respective wall and the head 22 of the bolt, and a washer 23 is mounted on the said shank at the outer side of the other side wall of the said cavity and between the last-mentioned wall and a nut 18 which engages the correspondingly threaded free end of the said shank. By tightening the said nut 18 on the said bolt 21 the side walls of the said cavity 8 are effectually tied together and spreading apart of the said walls from any cause is positively prevented. Opposite side walls of the cavity 8 in each limb 7, substantially at the point where the said walls are mechanically tied together, are braced internally of the limb by a metal tube 17 which is mounted on the bolt 21 of the said limb between washers 16 which are snugly interposed between the ends of the said tube and the said walls.

Each limb 7 is mechanically tied to the mechanical reinforcement of the trunk A preferably by a rod or bar G which is arranged within and longitudinally of the cavity 8 in the said limb and terminates at its outer end in an ear $g$ which surrounds the tube 17 on the bolt 21 of the said limb, which bar extends into the cavity $a$ in the trunk A and is attached in any approved manner to the mechanical reinforcement had for and interiorly of the said trunk.

When the trunk A and its limbs 7 have been mechanically reinforced as hereinbefore described any portions of the cavities $a$ and 8 which remain unoccupied by the said mechanical reinforcement are filled in any suitable manner, as, for instance, with cementitious material C.

What I claim is:—

1. An improvement in reinforcing a tree having a cavity which is formed in the trunk of the tree and extends to the exterior and longitudinally of the trunk, said improvement comprising a reinforcing of the trunk by mechanically tying together and mechanically bracing opposite side walls of the cavity at points spaced longitudinally of the trunk preparatory to filling any portions of the cavity, which remain unoccupied upon thus mechanically reinforcing the trunk, with cementitious material, and then filling the said portions of the cavity with cementitious material.

2. An improvement in reinforcing a tree having a cavity which is formed in the trunk of the tree and extends to the exterior and longitudinally of the trunk, said improvement comprising a reinforcing of the trunk by mechanically tying opposite side walls of the cavity together at points spaced longitudinally of the trunk, and mechanically tying the portion of the trunk at one end of the cavity to the portion of the trunk at the other end of the cavity, all preparatory to filling any portions of the cavity, which remain unoccupied upon thus mechanically reinforcing the trunk, with cementitious material, and then filling the said portions of the cavity with cementitious material.

3. An improvement in reinforcing a tree having a cavity in its trunk adjacent the inner end of a limb of the trunk, said improvement consisting in mechanically reinforcing the trunk at the said cavity and supporting the limb from the mechanical reinforcement of the trunk.

4. An improvement in reinforcing a tree having a cavity in its trunk adjacent the inner end of a limb of the trunk and also having a cavity which is formed in the inner end of the limb and connects with the cavity in the trunk, said improvement consisting in mechanically reinforcing the trunk at the cavity in the trunk, mechanically reinforcing the limb, and mechanically tying the mechanical reinforcement of the limb to the mechanical reinforcement of the trunk.

5. An improvement in reinforcing a tree having a cavity in its trunk adjacent the inner end of a limb of the trunk and also having a cavity which is formed in the inner end of the limb and connects with the cavity in the trunk, said improvement consisting in mechanically reinforcing the trunk interiorly and mechanically supporting the limb from the mechanical reinforcement of the trunk, and suitably filling with cementitious material any portions of the cavity in the trunk and the connected cavity in the limb which remain unoccupied upon mechanically reinforcing the trunk and connected limb as aforesaid.

6. An improvement in reinforcing a tree having a cavity in its trunk adjacent the inner end of a limb of the trunk and also having a cavity which is formed in the inner end of the limb and connects with the cavity in the trunk, said improvement consisting in mechanically reinforcing the trunk interiorly and mechanically tying the limb internally of the limb to the mechanical reinforcement of the trunk, and suitably filling with cementitious material any portions of the cavity in the trunk and the connected cavity in the limb which remain unoccupied upon mechanically reinforcing the trunk and connected limb as aforesaid.

7. An improvement in reinforcing a tree having a cavity in its trunk adjacent the inner end of a limb of the trunk and also having a cavity which is formed in the inner end of the said limb and connects with the cavity in the trunk, said improvement consisting in mechanically reinforcing the trunk interiorly, and mechanically tying together and bracing and thereby reinforcing opposite side walls of the cavity in the limb, and suitably filling with cementitious material any portions of the cavity in the trunk and the connected cavity in the limb which remain unoccupied upon mechanically reinforcing the trunk and connected limb as aforesaid.

8. An improvement in treating a bruised or wounded trunk of a live tree having a limb requiring reinforcement, said improvement consisting in mechanically reinforcing the trunk interiorly and mechanically tying the limb internally of the limb to the mechanical reinforcement of the supporting trunk.

In testimony whereof, I sign the foregoing specification, in the presence of two witnesses.

WELLINGTON E. DAVEY.

Witnesses:
C. H. DORER,
B. C. BROWN.